United States Patent [19]
Martig, Jr.

[11] 4,127,030
[45] Nov. 28, 1978

[54] FLOW MEASUREMENT

[76] Inventor: Kenneth W. Martig, Jr., 2116 Lakemoor Dr., Olympia, Wash. 98502

[21] Appl. No.: 841,299

[22] Filed: Oct. 12, 1977

[51] Int. Cl.² .............................................. G01F 1/00
[52] U.S. Cl. ................................. 73/194 R; 73/215
[58] Field of Search ............................ 73/194 R, 215

[56]     References Cited
        U.S. PATENT DOCUMENTS

| 3,412,612 | 11/1968 | Carr | 73/215 |
| 4,061,031 | 12/1977 | Grimsrud | 73/215 |

*Primary Examiner*—Herbert Goldstein
*Attorney, Agent, or Firm*—Charles A. McClure

[57]    ABSTRACT

Liquid flow through a sewer or water pipe or conduit is measured by admitting the liquid into a confining region of known dimensions from an open end of the pipe or conduit at such rate as to maintain the liquid depth constant in the pipe or conduit and determining the volume of liquid entering the region within a given time period. The depth in the pipe or conduit is conveniently monitored as static pressure of liquid, as is the depth in the confining region. Air is educted from the confining region as necessary to ensure admission of the liquid thereinto at the desired rate for constant in-pipe depth.

20 Claims, 3 Drawing Figures

FLOW MEASUREMENT

This invention relates to measurement of liquid flow through sewer or water pipes or conduits and concerns especially direct measurement of liquid flow therethrough while maintaining the flow depth constant therein.

While many devices exist for measuring flow of liquid, those that function in clean water or in a laboratory environment greatly outnumber those that function in wastewater or sewage. Indeed, to the extent that measurement of such liquid flow is undertaken, the method is nearly always indirect, depending on measurement of the extent to which the liquid rises in a flowrating device such as a weir or flume, or the extent to which some movable object interposed in the flow stream is deflected. Depositing of various undesirable substances thereinto or thereonto from sewage or wastewater is unavoidable and is a source of error as well as of maintenance requirements, etc. More direct flow measurement methods, such as timing the transporting of dye or salt downstream are superior to the indirect methods in many ways but usually impose a greater labor requirement and are less conducive to automatic operation.

A primary object of the present invention is provision of a direct method of measuring flow of liquid through a sewer or water pipe or conduit.

Another object of this invention is performance of such direct measurement automatically.

A further object of the invention is simple apparatus for so performing such method of liquid flow measurement.

Still another object is to render such method and such apparatus as suitable for use on sewage and wastewater as on clean water.

Yet another object is field operation of such method and such apparatus with as satisfactory results as obtainable under laboratory conditions.

Other objects of the present invention, together with means and methods for attaining the various objects will be apparent from the following description and the accompanying diagrams of preferred embodiments, which are presented by way of example rather than limitation.

FIG. 3 is a similar view of like components so used in a wet well, such as used in conjunction with a lift station or the like.

In general, the objects of the present invention are accomplished, in measuring liquid flow through a sewer or water pipe or conduit having an open end through which the liquid is discharged, by laterally confining the discharged liquid temporarily in a region of known dimensions, admitting liquid thereinto while maintaining constant liquid depth in the pipe or conduit, monitoring the depth of liquid in the confining region over time, and determining from the rise therein the rate of flow of liquid in the pipe or conduit. This process may include as an essential step educting air from some part of the confining region in order to admit liquid thereinto at a rate to maintain the liquid depth constant in the pipe or conduit.

Figure 1:
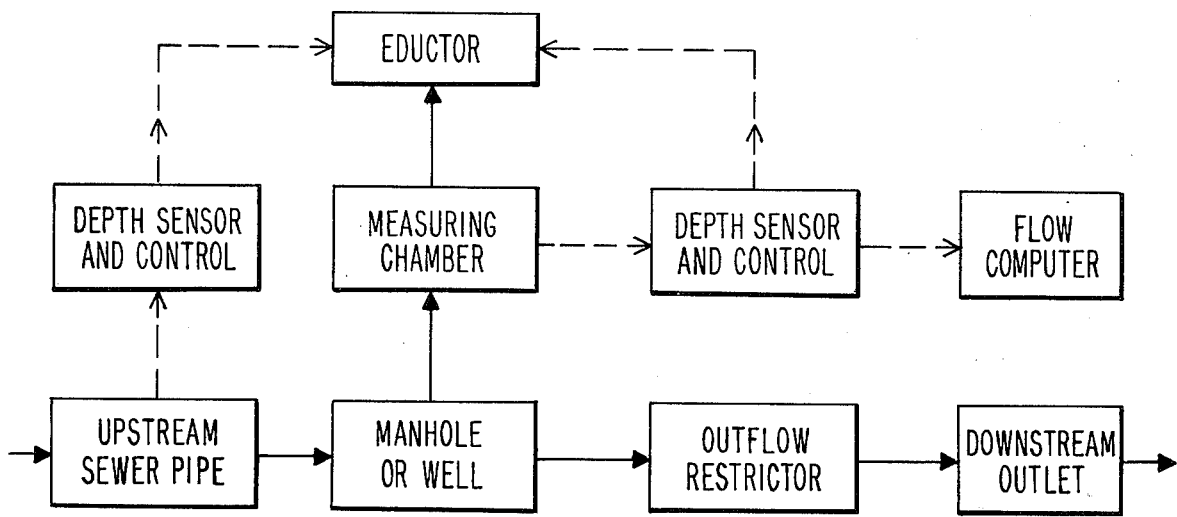
FIG. 1 is a schematic block diagram of components useful in practicing the present invention.

In apparatus terms the invention comprises means for monitoring the depth of liquid in the pipe or conduit, means for controlling the flow of liquid into the confining region to maintain the depth of liquid constant in the pipe or conduit in the event of liquid flow tending to rise in the confining region to a higher level than in the pipe or conduit, and means for determining the rate of flow of liquid from the quantity thereof entering the confining region in a given time. More specifically the apparatus may comprise a manhole or wet well of known dimensions having an available entrance thereinto for receiving liquid discharged from the pipe or conduit and having also means for discharging the liquid therefrom and alternatively retaining the liquid therein at least temporarily, means for monitoring the depth of liquid in the pipe or conduit and in the chamber, and means for maintaining the depth of the liquid constant in the pipe or conduit. The latter means may comprise a measuring chamber located within or apart from the confining manhole or wet well and provided with an inlet for liquid at its bottom and an outlet for air at its top for communication with an air eductor discharging to the atmosphere.;

FIG. 1 shows schematically components for practicing the present invention, with liquid flow indicated in solid lines (with arrows) and control interconnections in broken lines (also with arrows). In certain embodiments one or more of the indicated blocks may be superfluous, but all are illustrated here to be comprehensive.

At the lower center of FIG. 1 a manhole or well is indicated, which receives liquid flow thereinto from an upstream sewer pipe, for example, shown at the lower left. An outflow restrictor to flow from the manhole or well is located at the lower right, beyond which is a downstream outlet for the liquid therefrom.

Sensing and control components in FIG. 1 include a depth sensor and control for the upstream sewer pipe, a depth sensor and control for the measuring chamber, an eductor therefrom responsive to both of them, and a flow computer responsive to the second of them only. Interaction of the respective components is described more fully below, so here it suffices to say that any sensed increase in the in-pipe depth controls the eductor by turning it on (or speeds it up if already on) to exhaust air from and to draw liquid into the measuring chamber, and that when the chamber fills with liquid the sensed depth therein halts the first control and actuates appropriate liquid discharge means. The intervening time is noted also for use in flow computation.

Figure 2:
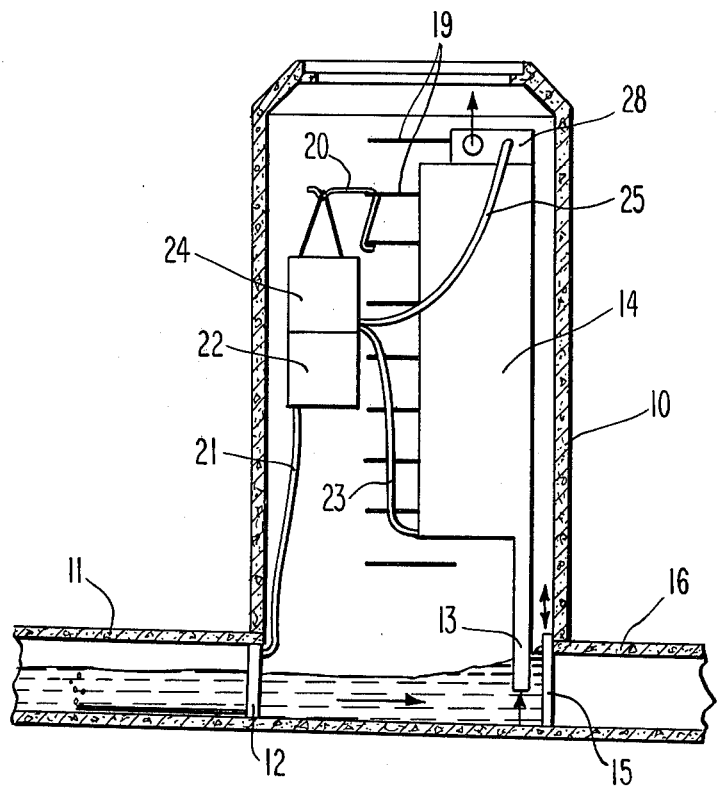
FIG. 2 is a somewhat schematic side elevation of the same components so used in a manhole.

FIG. 2 illustrates the application of this invention to liquid flow from a sewer pipe into a conventional manhole. Upstream sewer pipe 11 enters manhole 10, and downstream sewer pipe 16 leaves therefrom. Bubbler type depth-sensing probe 12 is located in the inlet pipe, and outflow restrictor 15 at the junction with the outlet pipe. Extending downward toward (but not reaching) the flow bed immediately upstream of the outflow restrictor is inlet dip tube 13 of measuring chamber 14, itself upstanding in the right half of the manhole and supported by attachement to the wall and/or ladder rings 19. Eductor 28 communicates therewith at the top of the measuring chamber to withdraw air therefrom and discharge it to the surrounding atmosphere when actuated. A generally horizontal arrow indicates the flow direction of liquid through the manhole, and vertical arrows indicate inflow of liquid therefrom into the dip tube and the bottom of the measuring chamber and outflow of air from the top of the measuring chamber and the eductor. Supported by a suitable hook 20 over the ladder rungs are first depth-monitoring instrument 22 connected by tubing 21 to probe 12, and second depth-monitoring instrument 24 connected by tubing 23 to the bottom of the measuring chamber. Control lines 25 lead from the second depth monitor to the eductor.

Figure 3:
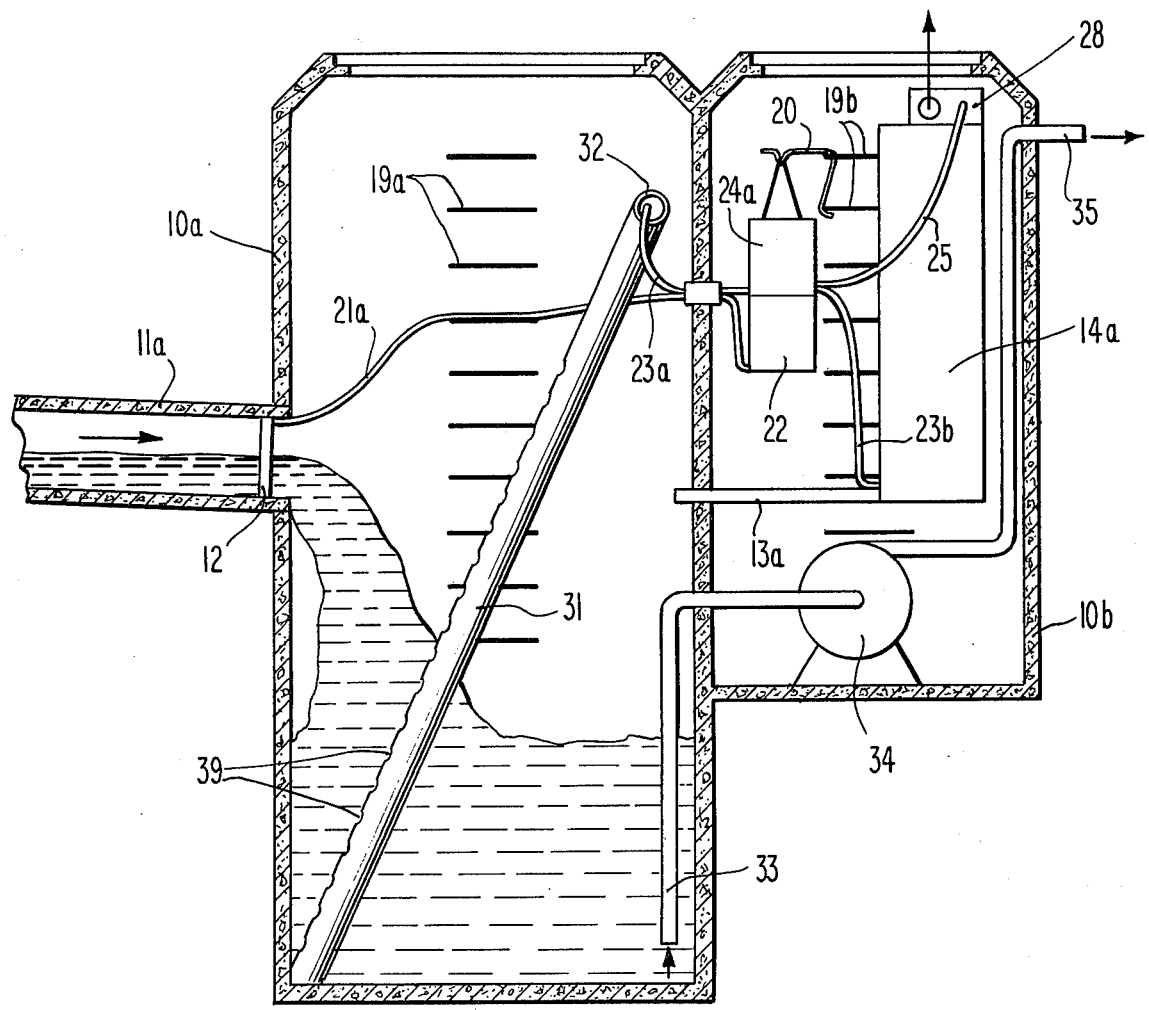

FIG. 3 similarly shows application of this invention to a lift station comprising wet well 10a and pumping compartment 10b. Components previously illustrated bear the same reference numerals unless altered (in which event alphabetical suffixes are added) and may not be mentioned again in the description of this view.

Entering sewer pipe 11a is considerably above the well flow, into which dips intake pipe 33 of pump 34 located in the adjacent compartment, from which the pumped liquid is exhausted via outlet pipe 35. Also extending into the wet well from this adjacent compartment, but at about the level of the sewer pipe, is intake pipe 13a for measuring chamber 14a located therein similarly to its location in the foregoing manhole. Resting with its crossbar 32 against one sidewall of the well and with its base leg 31 wedged into the opposite corner of the well floor is a T-shaped hollow stilling device, as is described more fully in my pending patent application, Ser. No. 804,542 filed June 8, 1977 and now U.S. Pat. No. 4,081,998. Tubing 23a from depth-monitoring instrument 24a in the pump compartment extends into the hollow crossbar and therethrough to and through the base leg of the stilling device to the vicinity of the well floor, where it is retained by an attached weight (not shown) or by fastening to the base leg, which conveniently has openings 39 in one side thereof to assure the same liquid level inside as outside. As before, tubing also goes from the instrument to the base of the receiving chamber, and control lines 25 to eductor 28 of the measuring chamber. Also, tubing goes from depth-monitoring instrument 22 to prove 32 in the sewer pipe. Such probe is described more fully in my pending patent application, Ser. Nos. 695,545 filed June 14, 1976, now U.S. Pat. No. 4,058,011; and in my pending application, Ser. No. 872,425 filed Jan. 26, 1978, which is a substitute for my abandoned application, Ser. No. 700,228 June 28, 1976; and in my U.S. Pat. No. 3,965,740, formerly Ser. No. 503,392 filed Sept. 5, 1974, upon which the foregoing are based. The patents also disclose simultaneous tracing of the depth by suitable recording apparatus.

Operation of the illustrated equipment to practice the present invention is readily understood in the light of the foregoing diagrams. Thus, in the manhole of FIG. 2, as soon as the restrictor to outflow therefrom is closed, the depth of water in the manhole and then in the entering pipe or conduit tends to rise. However, any such rise is sensed by the first depth monitor, which actuates the eductor to exhaust air from the measuring chamber, whereupon liquid from the manhole enters the measuring chamber through the immersed dip tube. Continued monitoring of the depth in the pipe or conduit and continued operation of the eductor, so as to maintain the entering liquid flow constant, increases the depth in the measuring chamber at a corresponding flow rate. At a suitable depth of liquid in the measuring chamber, as sensed by the second depth monitor, the restrictor is reopened. Outflow from the manhole tends to lower the depth in the pipe or conduit, whereupon the eductor is deenergized. Then the contents of the measuring chamber discharge therefrom and join the outflow from the manhole. Timing of liquid flow into the measuring chamber, which conveniently is of known constant horizontal cross-section, enables the known volume of flow over the time during which such volume of liquid accumulated in the chamber to be expressed as liquid volume per unit time. That is the same flow rate through the pipe or conduit in the absence of the outflow restriction, inasmuch as the flow depth in the pipe or conduit remained essentially unaltered during such timing. Thus, this flow measurement is direct, unlike the many known indirect methods, some of which were mentioned early in this specification.

In the wet well of FIG. 3 outflow is precluded by the well itself so long as the associated lift station pump is not actuated, thereby eliminating the gate-like restrictor of the preceding view. The well can serve as a measuring chamber so long as the depth of liquid therein does not reach the level of the entering sewer pipe or conduit. Accordingly, a like measurement can be made therein as in the measuring chamber of the preceding view, and monitoring of the depth therein and of the depth in the sewer pipe or conduit (thus not altered thereby) suffices. Under such circumstances no air eduction and corresponding liquid withdrawal into a separate measuring chamber will be required to determine the flow directly. The in-pipe sensor is merely monitored, as no control of in-pipe depth is required under such circumstances, and the change in depth in the well itself is sensed by the sensor in the stilling tube to enable the inflow volume to be determined. However, if and as the depth in the wet well reaches the entering liquid level, the eductor on the measuring chamber in the adjacent pump compartment may be actuated to permit continuation of such flow measurement as already described, wherein the eductor is actuated to exhaust air from the measuring chamber at a rate sufficient to draw liquid thereinto at the same rate as it is flowing into the well, in response to the in-pipe depth sensor, so as to keep the in-pipe depth constant. The in-chamber depth sensor and control discontinue the eductor action and enable the confining chamber to be emptied after sufficient liquid has been drawn into it for the measurement. Upon actuation of the lift pump the depth in the wet well is reduced, the liquid being exhausted via the outflow pump line leaving that compartment.

As before, the flow computation may be made by observation of volume accumulation over a timed period followed by manual or machine-assisted calculation. The selected manner and means of calculation of flow rates do not constitute any part of this invention, as they may be wholly conventional. For example, the flow of liquid into a confining measuring chamber of constant horizontal cross-section is the mathematical product of such cross-sectional area and the measured increment in liquid depth. This is true whether the flow is directly into a manhole or wet well below the level of the inflowing stream, or whether the flow is into a measuring chamber located within or apart therefrom as taught herein when the inflowing stream level is below such chamber--in which event the present disclosure enables the inflow to be maintained unchanged long enough to make such measurement. Flow rate may be computed by dividing the total flow volume by the flow duration, determined by a clock or other means for generating a time base, and it can be expressed in any suitable units, such as gallons per minute or liters per second. In the illustrated apparatus the departure from regularity represented by the dip tube of the measuring chamber may be taken into account appropriately (if not negligible), and any other dimensional irregularity of or in the chamber can be taken into account in calculating flow volume without difficulty, as will be apparent.

Despite certain illustration and description of apparatus and procedure for practicing the present invention, modifications may be made therein as by adding, combining, or subdividing parts or steps, or by substituting equivalents, while maintaining advantages and benefits of this invention, which itself is described in the following claims.

The claimed invention:

1. In measuring liquid flow through a sewer or water pipe or conduit having an open end through which the liquid is discharged, the improvement comprising monitoring the depth of liquid flowing therein over time, then laterally confining the discharged liquid temporarily in a region of known dimensions, admitting liquid thereinto while maintaining constant liquid depth in the pipe or conduit, monitoring the depth of liquid in the confining region over time, and determining from the rise therein the rate of flow of liquid in the pipe or conduit.

2. Flow measurement according to claim 1, including educting air from the confining region in order to admit liquid thereinto at a rate to maintain the liquid depth constant in the pipe or conduit.

3. Flow measurement according to claim 1, wherein the depth of liquid in the pipe or conduit is indicated indirectly by the pressure of liquid overlying a locus of pressure measurement therein.

4. Flow measurement according to claim 3, including the step of sensing the liquid pressure pneumatically.

5. In measuring liquid flow through a sewer or water pipe or conduit having an open end through which the liquid is discharged, the improvement comprising monitoring the depth of liquid flowing therein over time, then laterally confining the discharged liquid temporarily in an atmospheric region of known dimensions, educting air therefrom to the surrounding atmosphere and thereby drawing the liquid thereinto so as to maintain constant the liquid depth in the pipe or conduit, and monitoring the depth of liquid in the confining region over time.

6. Flow measurement according to claim 5, including the step of determining from the rise in liquid depth in the confining region the volumetric flow rate of liquid in the pipe or conduit in the absence of such confinement.

7. Flow measurement according to claim 5, wherein the flow depth in the pipe or conduit and the depth of liquid in the laterally confining region are recorded substantially continuously.

8. Apparatus for measuring liquid flow through a sewer or water pipe or conduit having an open end through which the liquid discharges into a temporarily confining region of known dimensions, comprising means for monitoring the depth of liquid in the pipe or conduit, means for controlling the flow of liquid into the confining region to maintain the depth of liquid constant in the pipe or conduit in the event of liquid rising in the confining region to a higher level than in the pipe or conduit, and means for determining the rate of flow of liquid from the quantity thereof entering the confining region in a given time.

9. Apparatus according to claim 8, wherein the rate determining means includes means for monitoring the depth of liquid in the confining region.

10. Apparatus according to claim 7, wherein the rate determining means includes means for generating a time base, means for computing the volume of liquid in the region from the monitored liquid depth therein from time to time, and means for comparing the liquid volumes therein from time to time and thereby determining the liquid flow rate.

11. Apparatus according to claim 8, wherein the controlling means includes means for educting air from the confining region and for so drawing water thereinto.

12. Apparatus according to claim 8, including intake means for the temporarily confining region and comprising a dip tube terminating at its lower end below the surface of the liquid in the pipe or conduit and upstream from outlet restrictor means.

13. Apparatus according to claim 12, including gate means downstream from the lower end of the dip tube and upstream from an outlet pipe or conduit.

14. Apparatus for measuring liquid flow through a sewer or water pipe or conduit having an open end through which the liquid discharges as into a well, comprising a chamber of known dimensions having an available entrance thereinto for receiving liquid discharged from the pipe or conduit and retaining the liquid therein at least temporarily, means for monitoring the depth of liquid in the pipe or conduit and in the chamber, and means for drawing liquid into the chamber so as to maintain the depth of the liquid constant in the pipe or conduit.

15. Apparatus according to claim 14, wherein the chamber has substantially constant horizontal cross-sectional area throughout the range of levels to which it accommodates the liquid.

16. Apparatus according to claim 14, wherein the means for depth monitoring includes pneumatic means for sensing the depth of the overlying liquid.

17. Apparatus according to claim 14, comprising the means for discharging the liquid from the well and chamber, including a gated exit.

18. Apparatus according to claim 14, comprising the means for discharging the liquid from the well and chamber, including a pump.

19. Apparatus according to claim 6, including eductor means responsive to and controlled by the means for monitoring the depth of liquid in the pipe or conduit and effective to draw the liquid into the chamber.

20. Apparatus according to claim 19, wherein the eductor means comprises an air pump for exhausting the chamber.

* * * * *